July 8, 1958  G. A. LYON  2,842,404
WHEEL COVER
Filed Sept. 15, 1955
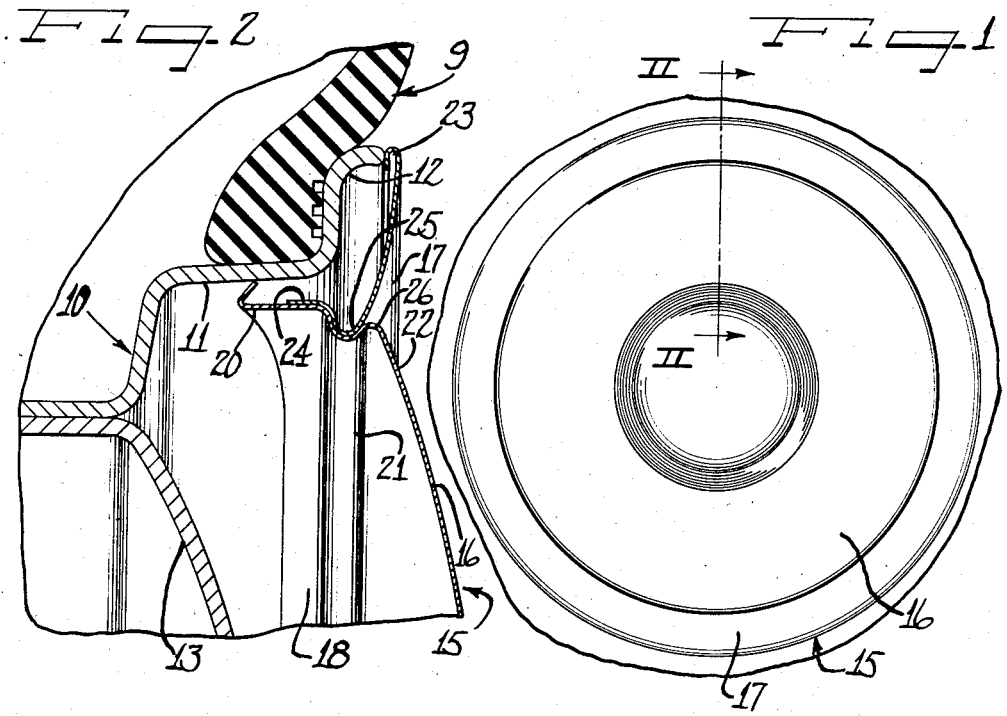
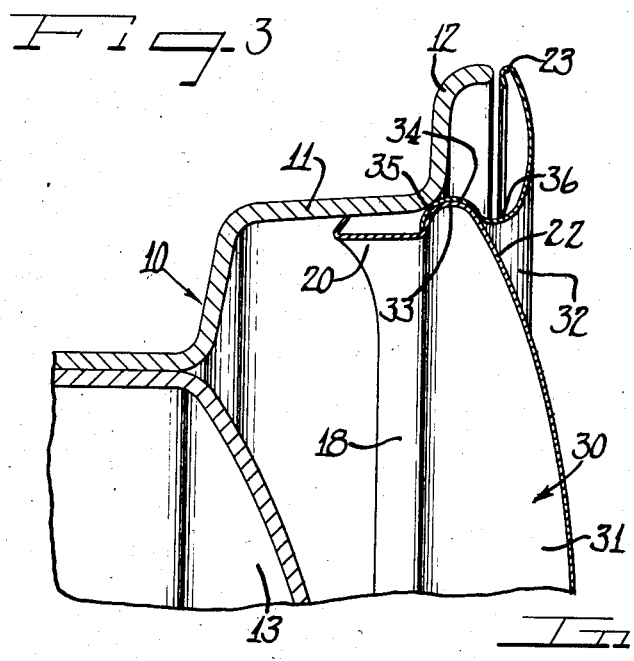
Inventor
George Albert Lyon

United States Patent Office 2,842,404
Patented July 8, 1958

2,842,404

WHEEL COVER

George Albert Lyon, Detroit, Mich.

Application September 15, 1955, Serial No. 534,536

8 Claims. (Cl. 301—37)

This invention relates to wheel structures and more particularly to a novel multi-part ornamental wheel cover.

At the present time there is a demand for wheel covers which can be made of different metallic materials for enabling contrasting color effects. While sheet steel is usually employed in wheel covers so as to provide resiliency in the retaining means of the cover, other metals, such as aluminum, lend themselves to color effects that are not always feasible in the use of steel. For illustration, by using an anodizing process aluminum can be given a great variety of lustrous colors, such, for illustration, as gold.

An object, therefore, of this invention is to provide a multi-part cover assembly wherein the retaining part of the cover can be made of steel, such as stainless steel, and an ornamental ring can be provided which can be made of different metal, such as aluminum, and interlocked in a simple manner to the other cover member.

Still another object of this invention is to provide a multi-part metallic wheel cover which lends itself to economical manufacture on a large production basis.

In accordance with the general features of this invention, there is provided in a wheel structure including a multi-flanged tire rim, a multi-part wheel cover including a central circular member and a peripheral ring member, the central member having a generally axially rearwardly turned flange terminating in spaced resilient cover retaining fingers for gripping engagement with a rim flange, the ring member extending radially beyond the axial flange and having a generally axially rearwardly turned annular flange at its inner periphery confronting the axial flange of said central member, one of the axial flanges having an annular groove and the other having an annular rib nested in the groove for interlocking the two cover members together and providing a reinforcing rib area adjacent and relative to which the fingers can resiliently flex so as to be backed up thereby.

Other features of the invention relate to the selective provision of the rib and groove in confronting flanges of the ring and central member to the cover.

Other objects and features of this invention may more fully appear from the following detailed description taken in connection with the accompanying drawings which illustrate several embodiments thereof and in which—

Figure 1 is a fragmentary side view of a wheel structure embodying the features of this invention;

Figure 2 is an enlarged fragmentary cross-sectional view taken on substantially the line II—II of Figure 1 looking in the direction indicated by the arrows; and Figure 3 is a fragmentary sectional view similar to Figure 2 illustrating the second form of the invention.

As shown on the drawings:

The reference character 9 designates generally a pneumatic tire and tube assembly mounted in the customary way upon a multi-flange drop-center type of tire rim 10 including an outer inclined axial flange 11 and a curled terminal flange 12. The rim 10 is supported in the customary manner upon a central body or spider member 13 detachably secured in a conventional manner at the center by wheel bolts (not shown).

Cooperable with the foregoing wheel is a multipart sheet metal cover designated generally by the reference character 15 and which includes a central or hub cap simulating member 16 and an outer peripheral ring 17. The central cover member has a generally axially extending flange 18 terminating in spaced, angled, resilient cover retaining fingers 20 which may be constructed in accordance with the teachings of my issued Patent No. 2,624,634 granted January 6, 1953. By virtue of the fact that these fingers must be resilient in order to have proper engagement with the axial rim flange 11, I preferably make the central cover member of sheet steel, such for example as stainless steel, which lends itself to a high lustrous finish.

An intermediate portion of the axial flange 18 is grooved at 21 adjacent the outer portion 22 of the member 16.

The outer peripheral ring 17, since it does not in itself retainingly engage the wheel, may be made of other metallic material, such, for example, as aluminum which lends itself to a variety of highly lustrous finishes in color, such for illustration as gold. Any suitable aluminum anodizing process may be employed in this regard.

The ring 17 is necessarily annular and is of a curved convex cross section. It has an outer turned peripheral edge 23 overlying and bottoming on the edge of terminal rim flange 12. The inner peripheral edge of the ring 17 is formed into a generally rearwardly extending annular flange 24 parallel to and overlying flange 18 of the central member 16. An intermediate portion of this axial flange 24 is provided with an annular rib 25.

Now, by virtue of the fact that the flanges 24 and 18 are in radial confronting relationship, rib 25 of ring 17 may be suitably interlocked in groove 21 of cover member 16 to secure the members together. This results in the provision of a reinforcing rib structure in close proximity to the retaining fingers 20 for backing up the fingers in their resilient caming engagement with inclined rim flange 11.

Thus, the ring 17 serves to extend the overall diameter of the cover 15 and at the same time enables the cover to be provided with contrasting color effects. This is possible by giving member 16 one type of finish, such as a lustrous finish, and by giving the member 17 a different finish or color.

The components of the cover may be assembled by disposing outer ring member 17 and more particularly rib 25 over annular shoulder 26 in interlocking cooperation with the central cover member 16 or by interlocking after assembly.

Assembly of the cover on the wheel may be effected by first centering the wheel cover with the wheel and thereafter urging the retaining fingers 20 into tensioned retained engagement with the tire rim 10. Removal may be effected by inserting a suitable pry-off tool under the pry-off edge 23 of the ring 17 and thereafter prying the cover and more particularly the fingers 20 out of engagement with the rim 10.

Figure 3 illustrates a modified form of my invention and wherever possible identical elements have been indicated by the same numerals as in the first form of my invention.

In this form of my invention the cover 30 has an inner cover member 31 and an outer cover member or ring 32 which are maintained in unitary relation in much the same manner as in the embodiment shown in Figure 2 with the cover cooperable with the tire rim 10 in a similar manner.

The inner cover member 31 includes an axial rib 33 formed adjacent to the outer portion 22 and merging into retaining fingers 20 at the other end.

The outer cover member or ring 32 is of a very similar construction to that of ring 17, shown in the first form of my invention, except the ring 32 terminates in an annular groove 34 at its axial and radial inner extremity which is especially adapted to interengage in locking assembly with rib 33. Thus when rib 33 is bottomed in groove 34 the cover members are locked together and in addition, provide a reinforcing rib area adjacent and relative to which the fingers can resiliently flex so as to be backed up thereby.

When the cover 30 is mounted upon the wheel it will be noted that flange 35 defining groove 34 is bottomed against the junction of the rim flanges 12 and 13. This is contrasted to the first form of the invention where the annular edge 23 is bottomed upon annular curled flange 12.

Assembly and removal of the cover 30 on the wheel may be effected in much the same manner as previously explained.

It will be understood that modifications and variations may be effected without departing from the scope of the novel concepts of the present invention, but it is understood that this application is to be limited only by the scope of the appended claims.

I claim as my invention:

1. In a wheel structure including a multi-flanged tire rim, a multi-part wheel cover including a central circular member and a peripheral ring member, said central member having a generally axially rearwardly turned flange terminating in spaced resilient cover retaining fingers for gripping engagement with a rim flange, said ring member extending radially beyond said axial flange and having a generally axially rearwardly turned annular flange at its inner periphery confronting the axial flange of said central member, one of said axial flanges having an annular groove and the other having an annular rib nested in said groove for interlocking the two cover members together and providing a reinforcing rib area adjacent and relative to which said fingers can resiliently flex so as to be backed up thereby.

2. In a wheel structure including a multi-flanged tire rim, a multi-part wheel cover including a central circular member and a peripheral ring member, said central member having a generally axially rearwardly turned flange terminating in spaced resilient cover retaining fingers for gripping engagement with a rim flange, said ring member extending radially beyond said axial flange and having a generally axially rearwardly turned annular flange at its inner periphery confronting the axial flange of said central member, one of said axial flanges having an annular groove and the other having an annular rib nested in said groove for interlocking the two cover members together and providing a reinforcing rib area adjacent and relative to which said fingers can resiliently flex so as to be backed up thereby, said groove being formed in the axial flange of said central member and said axial flange of the ring member being ribbed to extend into said groove and having a rearward extension therebeyond overlying in parallel relation a rearward portion of the axial flange of the central member in reinforcing close proximity to terminals of the retaining fingers.

3. In a wheel structure including a multi-flanged tire rim, a multi-part wheel cover including a central circular member and a peripheral ring member, said central member having a generally axially rearwardly turned flange terminating in spaced resilient cover retaining fingers for gripping engagement with a rim flange, said ring member extending radially beyond said axial flange and having a generally axially rearwardly turned annular flange at its inner periphery confronting the axial flange of said central member, one of said axial flanges having an annular groove and the other having an annular rib nested in said groove for interlocking the two cover members together and providing a reinforcing rib area adjacent and relative to which said fingers can resiliently flex so as to be backed up thereby, said rib comprising an annular turned periphery of the central member and said groove being formed in the axial flange of said ring member and transversely enveloping the rib-like periphery of the central member with said grooved portion bottomed against the tire rim to augment the retaining engagement between said members and to prevent axially inward deflection of the wheel cover to minimize damage to the wheel cover when abruptly struck against a curb stone.

4. In a wheel structure, a vehicle wheel including multi-flanged tire rim and body parts and having a tire rim surface, a wheel cover assembly for self retaining itself upon the vehicle wheel including an inner circular cover member and an outer annular cover member, said cover members each having an axially rearwardly turned annular flange with one of the flanges extending axially beyond the other of said flanges and provided with at least one resiliently deflectable cover retaining extension cooperable with said tire rim surface in detachable self retained assembly on the wheel, said flanges when said cover members are in assembly extending axially rearwardly in superimposed abutting relation with one of said flanges having a grooved portion and the other of said flanges having a rib nested in said grooved portion interlocking the cover members in unitary assembly and providing a reinforcing rib area closely adjacent said resiliently deflectable self retaining extension augmenting the resiliency thereof and relative to which said extension can resiliently flex so as to be backed up thereby.

5. The wheel cover assembly of claim 4 further characterized by the cover member having said resiliently deflectable cover retaining extension comprised of spring steel and the other of said cover members comprised of a material having a surface which lends itself to strikingly contrasted color effects relative to the steel cover member.

6. In a wheel structure, a vehicle wheel including multi-flanged tire rim and body parts and having a tire rim surface, a wheel cover assembly for self retaining itself upon the vehicle wheel including an inner circular cover member and an outer annular cover member, said cover members each having an axially rearwardly turned annular flange with one of the flanges extending axially beyond the other of said flanges and provided with at least one resiliently deflectable cover retaining extension cooperable with said tire rim surface in detachable self retained assembly on the wheel, said flanges when said cover members are in assembly extending axially rearwardly in superimposed abutting relation with one of said flanges having a grooved portion and the other of said flanges having a rib nested in said grooved portion interlocking the cover members in unitary assembly and providing a reinforcing rib area closely adjacent said resiliently deflectable self retaining extension augmenting the resiliency thereof and relative to which said extension can resiliently flex so as to be backed up thereby, said tire rim surface comprising an intermediate rim flange and said retaining extension comprising a finger retainingly cooperable with the intermediate rim flange which intermediate rim flange is radially spaced from the axially rearwardly turned flanges.

7. The wheel structure of claim 6 further characterized by said reinforcing rib area being disposed axially outwardly of said finger in bottomed engagement with the tire rim providing a back-up for the finger.

8. In a wheel structure, a vehicle wheel including multi-flanged tire rim and body parts and having a tire rim surface, a wheel cover assembly for self retaining itself upon the vehicle wheel including an inner circular cover member and an outer annular cover member, said cover members each having an axially rearwardly turned annular flange with one of the flanges extending axially beyond the other of said flanges and provided with at least one resiliently deflectable cover retaining extension cooperable with said tire rim surface in detachable self retained assembly on the wheel, said flanges when said cover members are in assembly extending axially rearwardly in superimposed abutting relation with one of said flanges having a grooved portion and the other of said flanges having a rib nested in said grooved portion interlocking the cover members in unitary assembly and providing a reinforcing rib area closely adjacent said resiliently deflectable self retaining extension augmenting the resiliency thereof and relative to which said extension can resiliently flex so as to be backed up thereby, said rearwardly turned flange on said inner cover member being provided with said at least one resiliently deflectable retaining extension and with said rearwardly flange on said outer cover member extending axially inwardly of said grooved portion in underlying abutting engagement with said rearwardly turned flange on said inner cover member.

References Cited in the file of this patent

UNITED STATES PATENTS

| | | |
|---|---|---|
| 2,368,251 | Lyon | Jan. 30, 1945 |
| 2,421,384 | Lyon | June 3, 1947 |
| 2,624,634 | Lyon | Jan. 6, 1953 |
| 2,683,632 | Lyon | July 13, 1954 |